US006334101B1

(12) United States Patent
Hetherington et al.

(10) Patent No.: US 6,334,101 B1
(45) Date of Patent: Dec. 25, 2001

(54) METHOD, SYSTEM AND COMPUTER PROGRAM PRODUCT FOR DYNAMIC DELIVERY OF HUMAN LANGUAGE TRANSLATIONS DURING SOFTWARE OPERATION

(75) Inventors: David James Hetherington, Austin, TX (US); David Bruce Kumhyr, Fuquay-Varina, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/211,814

(22) Filed: Dec. 15, 1998

(51) Int. Cl.[7] .............................. G06F 17/20; G06F 3/00
(52) U.S. Cl. ................................. 704/8; 345/340
(58) Field of Search ...................... 704/1, 8; 707/530, 707/536; 345/333, 334, 340, 171, 763, 764; 717/1, 2, 7; 709/250

(56) References Cited

U.S. PATENT DOCUMENTS

| | | | |
|---|---|---|---|
| 5,243,519 | * 9/1993 | Andrews et al. | 704/8 |
| 5,251,130 | * 10/1993 | Andrews et al. | 704/8 |
| 5,416,903 | * 5/1995 | Malcom | 704/8 |
| 5,583,761 | * 12/1996 | Chou | 704/8 |
| 5,652,884 | * 7/1997 | Palevich | 359/651 |
| 5,812,964 | 9/1998 | Finger | 704/7 |
| 5,907,326 | * 5/1999 | Atkin et al. | 345/334 |
| 5,974,372 | * 10/1999 | Barnes et al. | 704/8 |

* cited by examiner

*Primary Examiner*—Patrick N. Edouard
(74) *Attorney, Agent, or Firm*—Marilyn Smith Dawkins; Bracewell & Patterson, L.L.P.

(57) ABSTRACT

User interface text is implemented in identifiable software components separate from functional components containing human-language independent functionality for a software program. The software product may then be distributed and loaded into a user's system with only a basic set of human language translations for the user interface text. Different or additional human language translations may be provided to the user by downloading from an enterprise server associated with the system on which the software program is being executed, or from an Internet server operating for the software source. The additional human language translations may be downloaded, preferably automatically and invisibly to the user, to the user's system as necessary or requested. The human language translation process thus gains the "float" period normally associated with physical software distribution, speeding delivery times. Only required or desired human language translation need be stored on any given system, with additional translations consistently available if needed.

24 Claims, 6 Drawing Sheets

METHOD, SYSTEM AND COMPUTER PROGRAM PRODUCT FOR DYNAMIC DELIVERY OF HUMAN LANGUAGE TRANSLATIONS DURING SOFTWARE OPERATION

BACKGROUND OF THE INVENTION

1. Technical Field

The present invention relates in general to multilingual support for data processing system software and in particular to different human language translations of user interface text in multilingual software. Still more particularly, the present invention relates to delivering and installing a human language translation for user interface text within a software program separately from remaining functional components for that software program.

2. Description of the Related Art

Software products are frequently implemented for international distribution. In releasing and shipping software products worldwide, however, multiple human language versions of the software product are frequently required for distribution within different countries of regions. A considerable lag in delivery time is introduced by the fact that the human language translations of menus, dialog messages, control text, etc. is often not prepared until after the full functionality of the product is implemented.

Such human language translations of the software user interface text are typically the last step to be performed and results in the delay of product manufacture. Currently, translations introduced after the product has been shipped are typically delivered as a patch rather than a component of the product. Furthermore, all desired languages must either be selected during installation of the software product on a particular system and then updated or added by reinstallation, or all languages must be loaded onto a system, taking up storage space even if never needed. The conventional mechanism for distributing human language translations of a software product also does not lend itself to changes to the language files after delivery for fixes, corrections, or updates.

It would be desirable, therefore, to provide a mechanism for dynamic delivery of human language translations for a software product separate from distribution of the remaining functional components for the software product.

SUMMARY OF THE INVENTION

It is therefore one object of the present invention to provide an improved method, system and computer program product for multilingual support for data processing system software.

It is another object of the present invention to provide a method, system and computer program product for distributing different human language translations of user interface text in multilingual software.

It is yet another object of the present invention to provide a method, system and computer program product for delivering and installing a human language translation for user interface text within a software program separately from remaining functional components for that software program.

The foregoing objects are achieved as is now described. User interface text is implemented in identifiable software components separate from functional components containing human-language independent functionality for a software program. The software product may then be distributed and loaded into a user's system with only a basic set of human language translations for the user interface text. Different or additional human language translations may be provided to the user by downloading from an enterprise server associated with the system on which the software program is being executed, or from an Internet server operating for the software source. The additional human language translations may be downloaded, preferably automatically and invisibly to the user, to the user's system as necessary or requested. The human language translation process thus gains the "float" period normally associated with physical software distribution, speeding delivery times. Only required or desired human language translation need be stored on any given system, with additional translations consistently available if needed.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
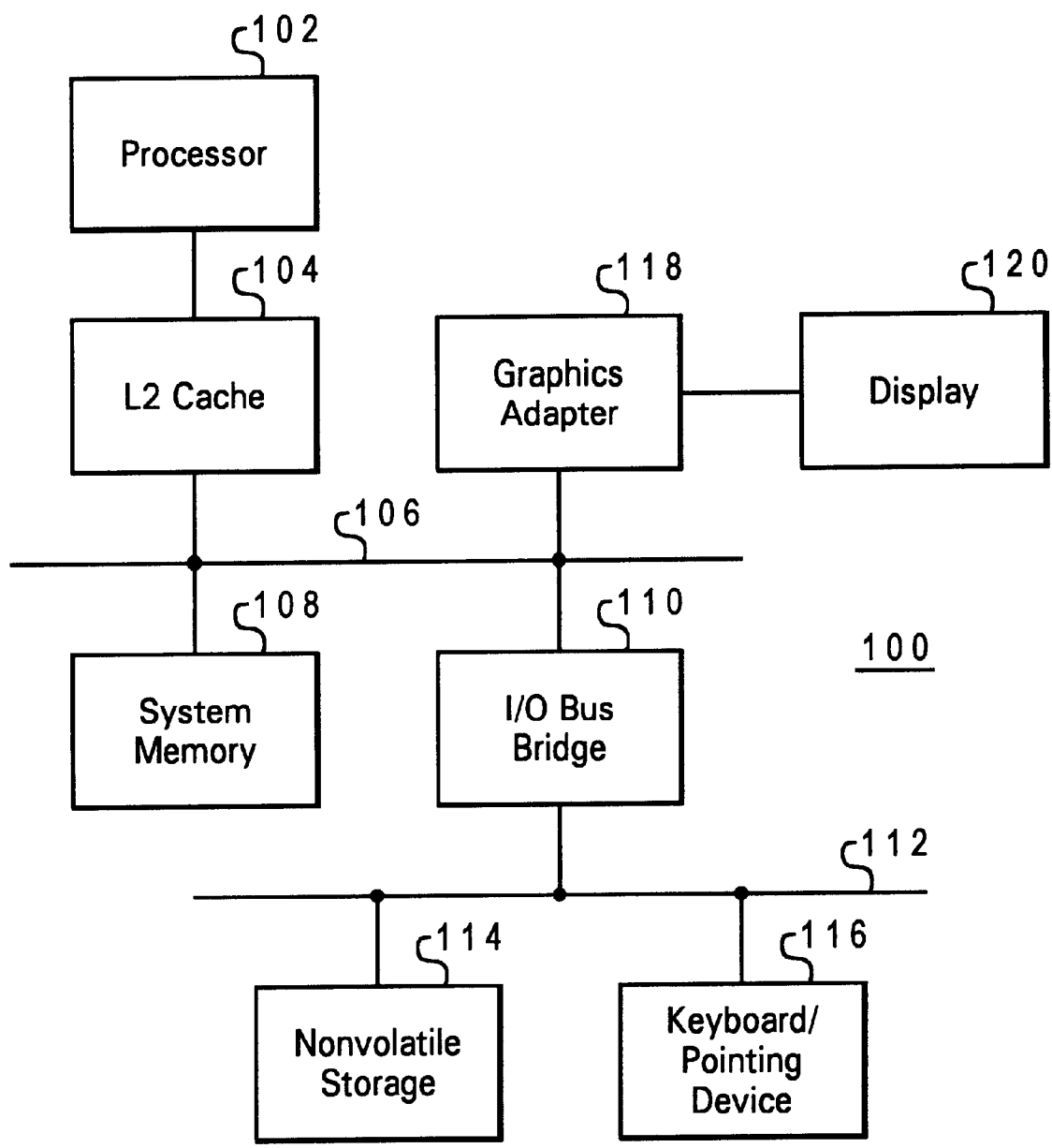
FIG. 1 depicts a block diagram of a data processing system in which a preferred embodiment of the present invention may be implemented.

With reference now to the figures, and in particular with reference to FIG. 1, a block diagram of a data processing system in which a preferred embodiment of the present invention may be implemented is depicted. Data processing system 100 may be, for example, one of the Aptiva® models of personal computers available from International Business Machines Corporation of Armonk, N.Y. Data processing system 100 includes a processor 102, which in the exemplary embodiment is connected to a level two (L2) cache 104, which is connected in turn to a system bus 106. In the exemplary embodiment, data processing system 100 includes graphics adapter 118 connected to system bus 106, receiving user interface information for display 120.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital versatile (DVD) drive, a sound card and audio speakers, and numerous other optional components. All such variations are believed to be within the spirit and scope of the present invention. Data processing system 100 and the Java implementation examples below are provided solely as examples for the purposes of explanation and are not intended to imply architectural limitations. Those skilled in the art will recognize the numerous programming languages which may be utilized, all of which are believed to be embraced within the spirit and scope of the invention.

Figure 2A:
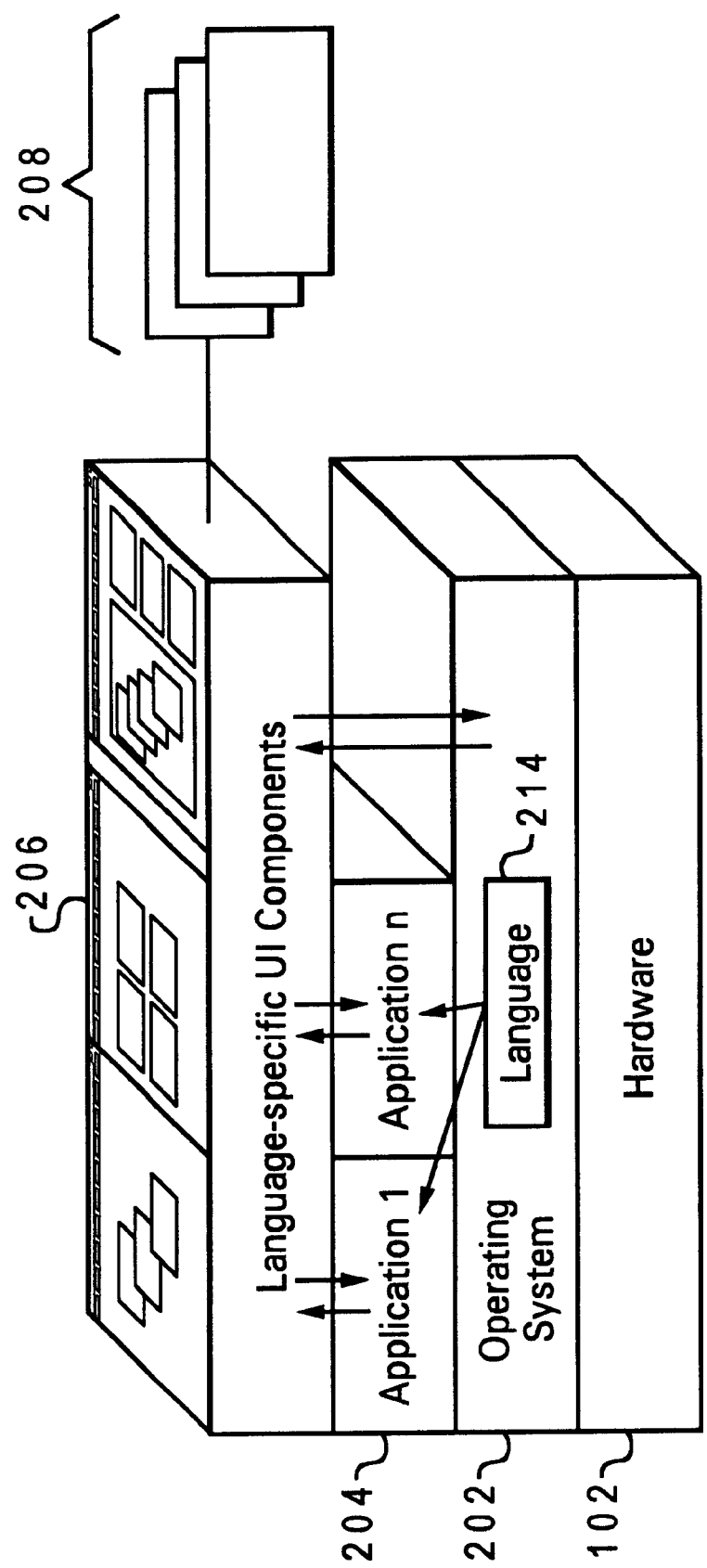
FIGS. 2A–2D are diagrams of layering or segregating operational and language-specific portions of a software program to facilitate dynamic language switching in accordance with a preferred embodiment of the present invention.

Referring to FIG. 2A, a diagram of layering operational and language-specific portions of a software program to facilitate dynamic language switching in accordance with a preferred embodiment of the present invention is illustrated. As is known in the art, an operating system 202 runs on data processing system 100, and applications 204 run on operating system 202. Applications 204 typically include one or more user interface components (menus, dialogs, help files, buttons, etc.) employing text labels.

To facilitate dynamic language switching, all user interface text and other language-specific user interface components 206—e.g., menus, dialog box messages, help text, etc.—is separated from the operation of the software in the present invention. The user interface text is distinct from the working text of an application (that is, text entered by a user). Language-specific components 206 are selected from a library 208 of different versions of the language-specific components for various languages. In some cases, the layering of language-specific components 206 from the underlying functionality may extend to user interface text for operating system 202 as well as for the user interface of applications 204. This layering of language-specific UI components 206 from the underlying applications 204 and/or operations system 202 functionality permits the language for the software user interface to be changed dynamically, while a program is running.

Only the presentation of the information within the user interface is changed, while the information itself and the format remain the same. Thus, for example, different system administrators may each choose whichever language they prefer during run time, so that German system administrators could select menus in German while Japanese system administrators select menus in Japanese even though both are working on the same system and looking at the same system status information. Additionally, the working text language is not necessarily affected by changes to the user interface text, so that a user may be working in one language (e.g., English) with the user interface being in a second language (e.g., Japanese).

With the present invention, changes in user interface text may be achieved dynamically without shutting down the underlying application, and in particular without requiring that a separate executable version of the application be employed. This allows users to change user interface display languages on the fly, and permits multiple users of an application to change the display language.

The layering of language-specific UI text and components from underlying operation may be readily extended to an application environment or operating system 204. This permits different users to operate the same system in different languages without "bouncing" (shutting down and then rebooting) the system by dynamically changing the language in which user interface text is displayed.

Figure 2B:
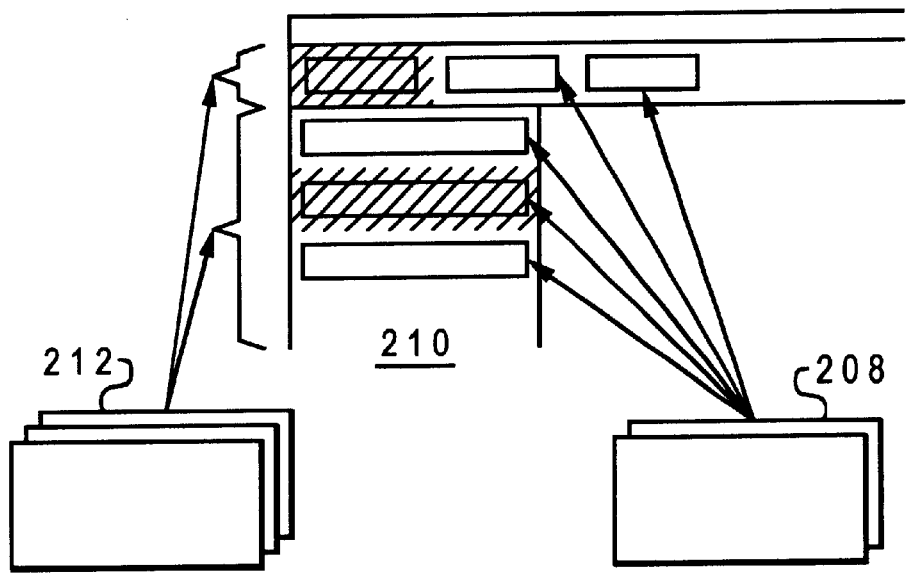
Figure 2C:
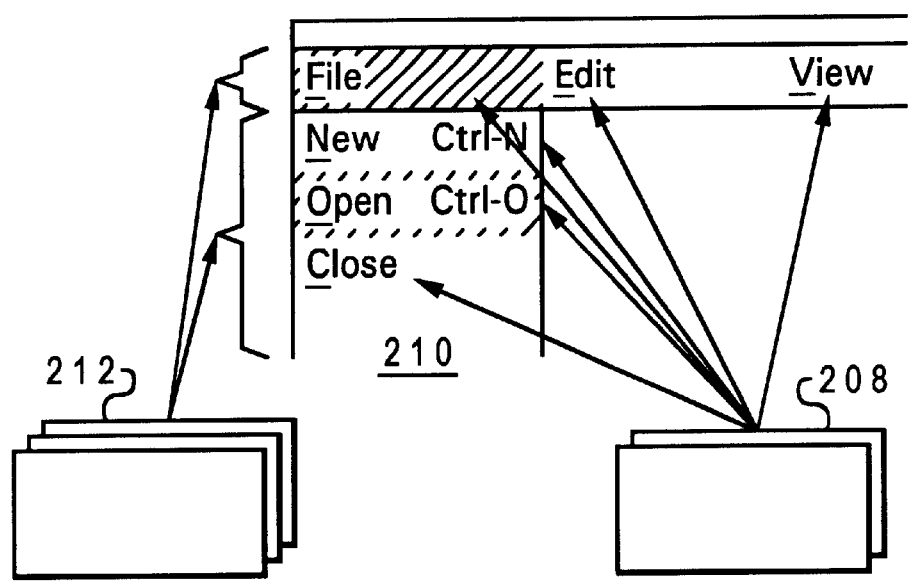
Figure 2D:
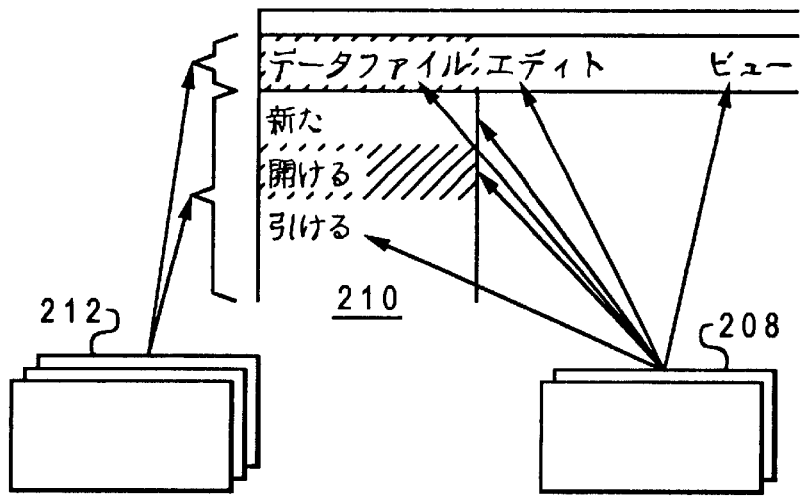

FIGS. 2B through 2D are diagrams illustrating how user-interface text may be separated from underlying operational functionality in accordance with the present invention. A user interface 210 includes menus which are established and formatted by a first set of objects or constructors 212. The text for those menus, however, is obtained from a separate set of objects or constructors 208.

This separation of user interface text from user interface functionality is readily achieved in, for example, Java. The Java Abstract Windowing Toolkit (AWT) includes methods which may be invoked to create a user interface menu item. The Java menu (label) method creates a menu item labeled with the text provided as the parameter "label." Instead of including the label parameter within the constructor invoking the menu ( ) method, the label may be placed as a field within a constructor for a data object containing the text for the label. Thus, for instance, a reference to MenuLabels.FIRST may be employed as a parameter for invoking the menu method, where "first" is a field within the object "MenuLabels" containing the text for the corresponding menu item. The text from such a separate storage object 208 is then combined with the menu items from operational objects 212 to generate user interface display 210 as shown in FIGS. 2C–2D.

Java also includes methods for displaying dialogs, buttons, help text, and other text-based user interface components. The textual parameters for such methods may similarly be derived from a separate, language-specific object. Since Java is dynamically linked at run-time, the appropriate user-interface text-storage object version may be selected at run time from a library of resource files.

Referring back to FIG. 2A, operating system 202 may include a language or "regional setting" property or variable 214 as shown. Property 214 may contain either an uppercase, two letter ISO Country Code as defined by ISO-3166 or a lower-case, two letter ISO Language Code as defined by IS0-639, or both. User interface text files 208 may be selected based on the content of property 214. Changing property 214 may cause user interface components registered as subscribers for language change request notification to reload with different human-language text drawn from a different UI text storage object 208, dynamically changing the UI display language.

Although illustrated in the context of Java, the present invention may be implemented within software written in a programming language which is fully compiled and linked prior to distribution. The user interface text should be implemented within separate software components, such as a dynamic-link library (DLL) file, for example, which are selected and loaded at run time. Additionally, even within software written in Java or similar languages, separate entire constructors may be implemented for user interface components rather than merely separate UI text storage objects.

Figure 3:
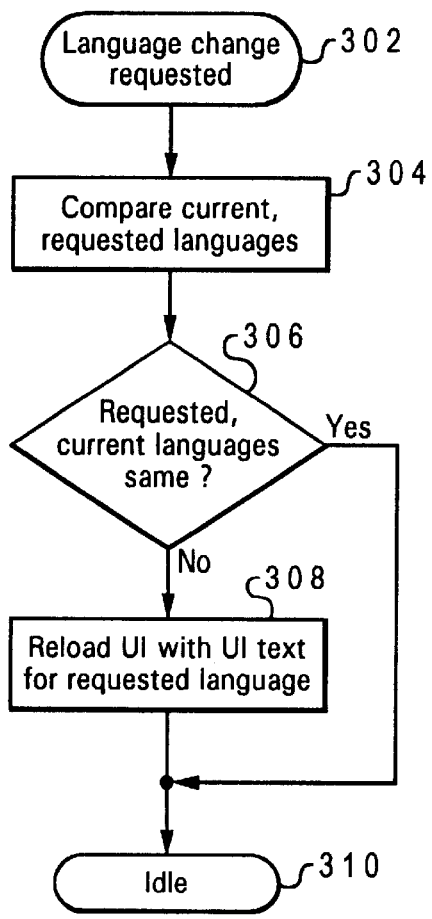
FIG. 3 depicts a high level flowchart for a process of dynamically changing user interface text in accordance with a preferred embodiment of the present invention.

With reference now to FIG. 3, a high level flowchart for a process of dynamically changing user interface text in accordance with a preferred embodiment of the present invention is depicted. The process begins at step 302, which illustrates a language change request being received. This may correspond to a change in a language property setting as described above.

The process next passes to step 304, which illustrates comparing the requested language to the current language, and then to step 306, which depicts a determination of whether the requested and current languages are the same. If so, the process proceeds to step 308, which illustrates reloading the user interface with user interface text for the requested language. If not, however, or upon successfully reloading the user interface, the process proceeds to step 310, which illustrates the process becoming idle until another language change request is received. One advantage of segmenting user interface text from underlying operational functionality is the "float" which is created for delivery human language translations for a particular product. In releasing and shipping products worldwide, a considerable lag in delivery time is introduced by the fact that the human language translations of menus, dialog messages, control text, etc. is often not prepared until after the full functionality of the product is implemented. Such human language translations are typically the last step to be performed and results in the delay of product manufacture.

Figure 4:
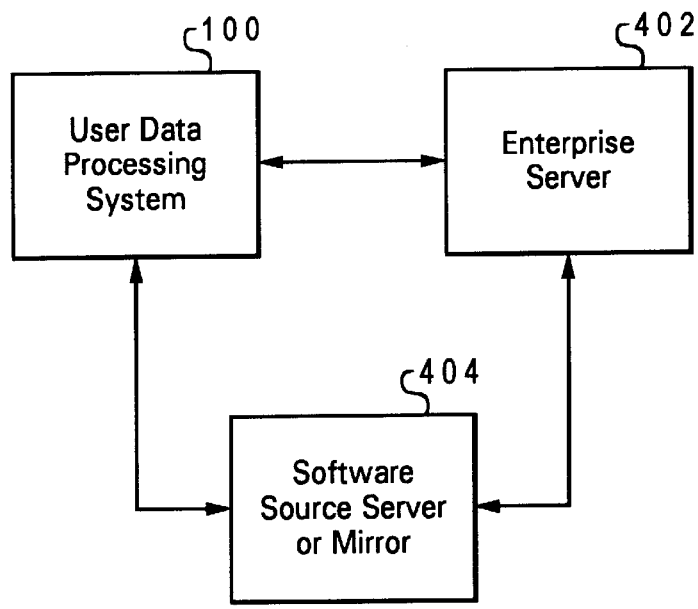
FIG. 4 is a diagram of a mechanism for dynamic translation delivery in accordance with a preferred embodiment of the present invention.
Figure 5A:
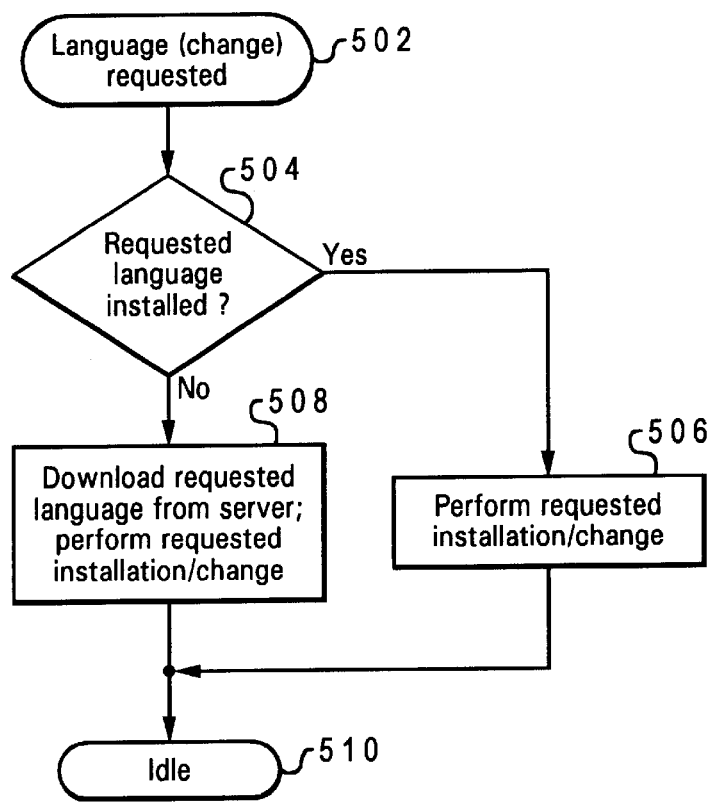
FIGS. 5A–5B are a high level flowcharts for processes of dynamic translation delivery in accordance with a preferred embodiment of the present invention.
Figure 5B:
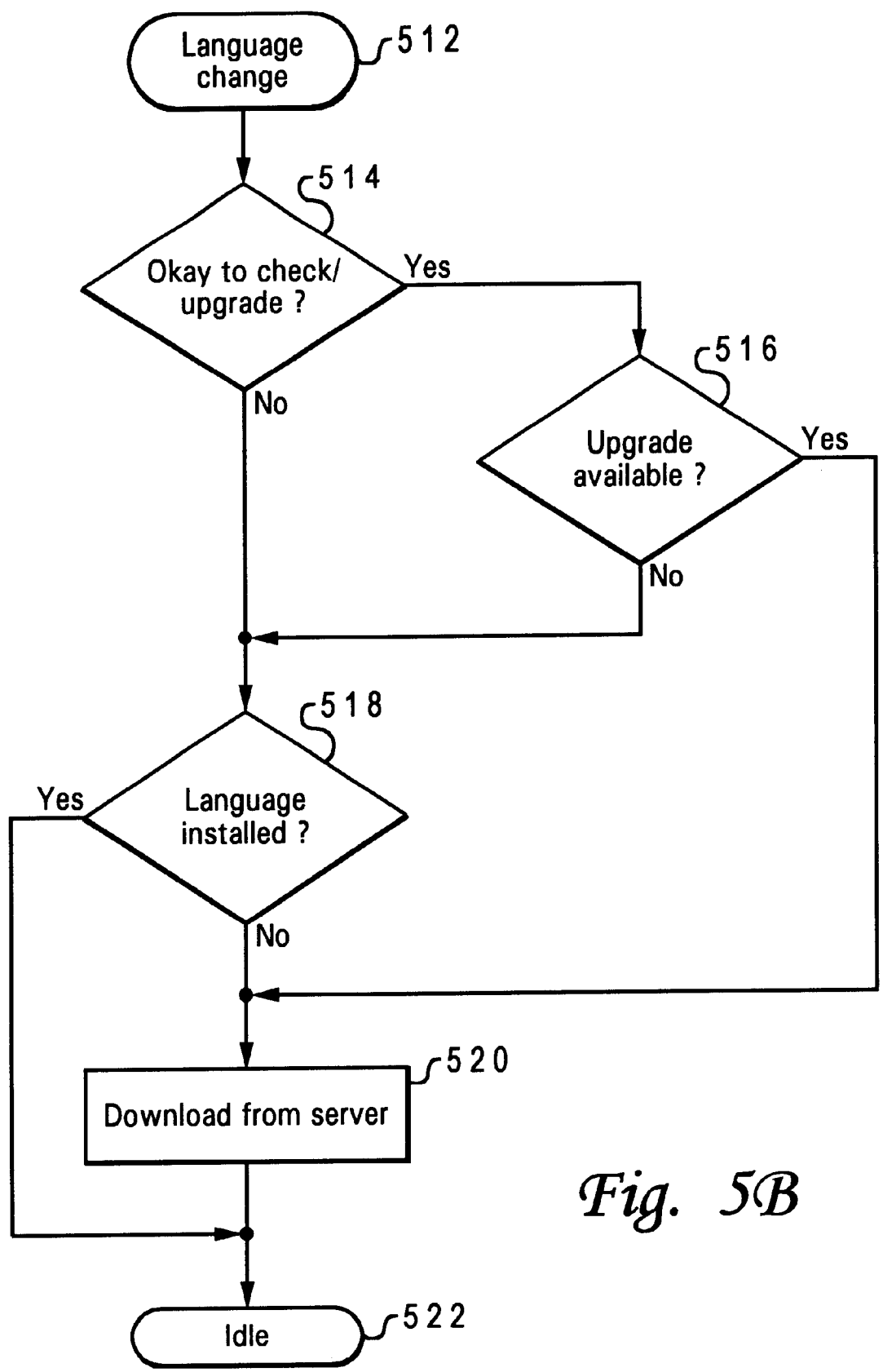

Referring to FIGS. 4 and 5A–5B, a mechanism and process for dynamic translation delivery in accordance with a preferred embodiment of the present invention are illustrated. FIGS. 4–5 should be read in conjunction with each other and with FIGS. 2–3. By taking advantage of the layering of language-specific user interface components from software operation as described above in connections with FIGS. 2–3, human language translations of user interface text may be distributed separately from the core software functionality. The product may be shipped and installed on a system 100 with only some basic languages (perhaps a set of core languages, or even English alone) provided. The product may be installed with this minimal set of basic languages, and the user required to select from those available. Alternatively, the user may be permitted to select a language other than one of the basic languages during installation, with an automatic download process being employed as described below to retrieve files for the selected language.

When a user requests a language during installation or subsequently initiates a language change on system 100 for a language not shipped with the initial product, an update is automatically initiated either from an enterprise server 402 associated with the enterprise to which the user of system 100 belongs, from software source server 404 operated by the enterprise producing or distributing the software (or a mirror of the software source server site), or from software source server 404 via enterprise server 402. The requested language translation is delivered as a set of language-specific components for the software together with appropriate resource files. The update may be performed automatically and transparently using processes and/or Internet transactions known in the art.

FIG. 5A is a high level flowchart for a process of dynamic translation delivery in accordance with a preferred embodiment of the present invention. The process begins at step 502, which depicts a language being selected during installation or during a language change process. Again, the installation or change may entail setting or changing a language property for the host data processing system as described earlier. The process then passes to step 504, which illustrates a determination of whether the requested language translation is installed. If so, the process proceeds to step 506, which depicts performing the requested language installation or change.

However, if the requested language translation is not installed, the process proceeds instead to step 508, which illustrates downloading the requested language translation (preferably automatically and invisibly to the user) from an enterprise server or, if not available from any local area network (LAN) server, from the World Wide Web, then performing the requested language installation or change. From either of steps 506 or 508, the process then passes to step 510, which depicts the process becoming idle until another language installation or change is requested.

FIG. 5B is a high level flowchart for an alternative process of dynamic translation delivery in accordance with a preferred embodiment of the present invention. This embodiment demonstrates application of the present invention to serial versioning of a software product. Dynamic delivery of translations allows additional translations to be progressively made available for a product after release. The process begins at step 512, which depicts a language change being initiated. The process then passes to step 514, which illustrates a determination of whether it is okay to check for or perform an upgrade. This determination may be made, for example, based on the period of time which has elapsed since initial intallation of the software product on the customer's computer and/or since a last request for a language change was received.

If it is okay to check for an upgrade, the process proceeds to step 514, which depicts a determination of whether an upgrade is available at the software vendor's server. The upgrade may include additional languages made available by the software vendor after initial release of the software product. If an upgrade is available, the process skips to step 520, which illustrates downloading the upgrade from the software vendor's server.

If it is determined not to be okay to check for or perform an upgrade in step 514, or if no upgrade is determined to be available in step 516, the process proceeds instead to step 518, which depicts a determination of whether the requested language is installed on the customer's system. If not, the process proceeds to step 520, which illustrates downloading the requested language from the server, and then to step 522. If so, however, the process proceeds instead to step 522, which depicts the process becoming idle until another language change request is received.

The mechanism of the present invention for dynamic translation delivery allows language translations to be shipped late, taking advantage of the "float" associated with physical distribution of the media from which the product is installed. The human language translation thus gains the time which is required to manufacture and ship the product to distribution channels and then to the customer, which should be sufficient to complete the required language translations in most cases.

The initially shipped product may display a list of the basic languages to the user together with a "New Language" selection control for retrieving languages from the enterprise or software source server(s). Alternatively, two lists of language selections may be displayed, installed and available via download. In still another alternative, a single list of all languages may be displayed with those languages already installed emphasized and others automatically downloaded upon selection. In any case, additional translations may be made and distributed at any time after the product introduction without a patch or subsequent new version product shipment.

The present invention separates the language which the user is working in from the language of the user interface, so that a user may be writing a document in Japanese (with all the special features needed to properly process Japanese text) but elect to have all menus and help text in Russian or Arabic. Additionally, the language of the user interface may be changed on the fly. If, while changing the user interface language, the user does not see the desired language, it may be downloaded from a Web site within the Internet and selected for the user interface all without stopping the application. Language translations may be downloaded from the software vendor's Web server long after (perhaps even a year or two, or more) after the customer purchased the original copy of the software. This is a tremendous convenience for both the customer and the software vendor.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing media used to actually carry out the distribution. Examples of computer usable media include: nonvolatile, hard-coded type media such as read only memories (ROMs) or erasable, electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method of delivering language translations for a software program, comprising:
    segregating user interface text for a software program from one or more operational components containing a human language-independent functionality for the software program;
    distributing the operational components with at least one set of user interface text components containing all required user interface text in at least one human language translation for the software program; and
    delivering, to a system on which the software program is being installed or executed, a set of user interface text components for a human language translation not included in the user interface text components distributed with the operational components.

2. The method of claim 1, wherein the step of segregating user interface text for a software program from one or more operational components containing a human language-independent functionality for the software program further comprises:
    defining menu labels, button labels, dialog messages and help text in software components separate from functional components for forming menu items, buttons, dialogs, and help displays within a user interface for the software program.

3. The method of claim 1, wherein the step of distributing the operational components with at least one set of user interface text components containing all required user interface text in at least one human language for the software program further comprises:
    distributing a plurality of sets of user interface text components for a basic set of human language translations of the software program with the operational components.

4. The method of claim 1, wherein the step of delivering a set of user interface text components for a human language translation not included in the user interface text components distributed with the operational components further comprises:
    responsive to a request for a specific human language translation during installation of the software program, retrieving a set of user interface text components for the requested human language translation.

5. The method of claim 1, wherein the step of delivering a set of user interface text components for a human language translation not included in the user interface text components distributed with the operational components further comprises:
    responsive to a request for changing a user interface to a specific human language translation during execution of the software program, retrieving a set of user interface text components for the requested human language translation.

6. The method of claim 1, wherein the step of delivering a set of user interface text components for a human language translation not included in the user interface text components distributed with the operational components further comprises:
    retrieving the set of user interface text components for the human language translation from an enterprise server coupled to the system.

7. The method of claim 1, wherein the step of delivering a set of user interface text components for a human language translation not included in the user interface text components distributed with the operational components further comprises:
    retrieving the set of user interface text components for the human language translation from an Internet server.

8. The method of claim 1, wherein the step of delivering a set of user interface text components for a human language translation not included in the user interface text components distributed with the operational components further comprises:
    automatically retrieving the set of user interface text components for the human language translation from a server in response to a user request for the human language translation without requiring user initiation of the retrieval.

9. A system for delivering language translations for a software program, comprising:
    means for segregating user interface text for a software program from one or more operational components containing a human language-independent functionality for the software program;
    means for distributing the operational components with at least one set of user interface text components containing all required user interface text in at least one human language translation for the software program; and
    means for delivering, to a system on which the software program is being installed or executed, a set of user interface text components for a human language translation not included in the user interface text components distributed with the operational components.

10. The system of claim 9, wherein the means for segregating user interface text for a software program from one or more operational components containing a human language-independent functionality for the software program further comprises:
    means for defining menu labels, button labels, dialog messages and help text in software components separate from functional components for forming menu items, buttons, dialogs, and help displays within a user interface for the software program.

11. The system of claim 9, wherein the means for distributing the operational components with at least one set of user interface text components containing all required user interface text in at least one human language for the software program further comprises:

means for distributing a plurality of sets of user interface text components for a basic set of human language translations of the software program with the operational components.

12. The system of claim 9, wherein the means for delivering a set of user interface text components for a human language translation not included in the user interface text components distributed with the operational components further comprises:

means, responsive to a request for a specific human language translation during installation of the software program, for retrieving a set of user interface text components for the requested human language translation.

13. The system of claim 9, wherein the means for delivering a set of user interface text components for a human language translation not included in the user interface text components distributed with the operational components further comprises:

means, responsive to a request for changing a user interface to a specific human language translation during execution of the software program, for retrieving a set of user interface text components for the requested human language translation.

14. The system of claim 9, wherein the means for delivering a set of user interface text components for a human language translation not included in the user interface text components distributed with the operational components further comprises:

means for retrieving the set of user interface text components for the human language translation from an enterprise server coupled to the system.

15. The system of claim 9, wherein the means for delivering a set of user interface text components for a human language translation not included in the user interface text components distributed with the operational components further comprises:

means for retrieving the set of user interface text components for the human language translation from an Internet server.

16. The system of claim 9, wherein the means for delivering a set of user interface text components for a human language translation not included in the user interface text components distributed with the operational components further comprises:

means for automatically retrieving the set of user interface text components for the human language translation from a server in response to a user request for the human language translation without requiring user initiation of the retrieval.

17. A computer program product within a computer usable medium for delivering language translations for a software program, comprising:

instructions for segregating user interface text for a software program from one or more operational components containing a human language-independent functionality for the software program;

instructions for distributing the operational components with at least one set of user interface text components containing all required user interface text in at least one human language translation for the software program; and instructions for delivering, to a system on which the software program is being installed or executed, a set of user interface text components for a human language translation not included in the user interface text components distributed with the operational components.

18. The computer program product of claim 17, wherein the instructions for segregating user interface text for a software program from one or more operational components containing a human language-independent functionality for the software program further comprises:

instructions for defining menu labels, button labels, dialog messages and help text in software components separate from functional components for forming menu items, buttons, dialogs, and help displays within a user interface for the software program.

19. The computer program product of claim 17, wherein the instructions for distributing the operational components with at least one set of user interface text components containing all required user interface text in at least one human language for the software program further comprises:

instructions for distributing a plurality of sets of user interface text components for a basic set of human language translations of the software program with the operational components.

20. The computer program product of claim 17, wherein the instructions for delivering a set of user interface text components for a human language translation not included in the user interface text components distributed with the operational components further comprises:

instructions, responsive to a request for a specific human language translation during installation of the software program, for retrieving a set of user interface text components for the requested human language translation.

21. The computer program product of claim 17, wherein the instructions for delivering a set of user interface text components for a human language translation not included in the user interface text components distributed with the operational components further comprises:

instructions, responsive to a request for changing a user interface to a specific human language translation during execution of the software program, for retrieving a set of user interface text components for the requested human language translation.

22. The computer program product of claim 17, wherein the instructions for delivering a set of user interface text components for a human language translation not included in the user interface text components distributed with the operational components further comprises:

instructions for retrieving the set of user interface text components for the human language translation from an enterprise server coupled to the system.

23. The computer program product of claim 17, wherein the instructions for delivering a set of user interface text components for a human language translation not included in the user interface text components distributed with the operational components further comprises:

instructions for retrieving the set of user interface text components for the human language translation from an Internet server.

24. The computer program product of claim 17, wherein the instructions for delivering a set of user interface text components for a human language translation not included in the user interface text components distributed with the operational components further comprises:

instructions for automatically retrieving the set of user interface text components for the human language translation from a server in response to a user request for the human language translation without requiring user initiation of the retrieval.

* * * * *